United States Patent Office 3,249,580
Patented May 3, 1966

---

3,249,580
AIR-CURING ORGANOSILICON BLOCK COPOLYMERS CONTAINING POLYSILANE BLOCKS AND ORGANOSILICON BLOCKS
Henry Nelson Beck, Midland, Mich., assignor to Dow Corning Corporation, Midland, Mich., a corporation of Michigan
No Drawing. Filed July 25, 1962, Ser. No. 212,484
18 Claims. (Cl. 260—37)

This invention relates to a new organosilicon polymer that cures on exposure to air.

The use of materials that cure to solid rubbery articles at normal temperatures has increased drastically in recent years. Most of the available materials are of the type known as "2-component" or "2-part" systems, whereby curing of the composition commences from the time the two parts are mixed. Examples of such systems are given in U.S. Patents 2,843,555, 2,902,467, 2,927,907, and 2,983,694. While in each of these systems the compositions vary somewhat, the completed compositions in all cases will cure at ordinary temperatures. Thus, practical use of these systems requires that they be packaged part in at least two components, then mixed just prior to use. It can readily be seen that such a system, while quite useful for many applications, is cumbersome in that mixing operations must be carried out often far from power equipment and in that unused mixed material is unrecoverable.

A more convenient and versatile system is a one-component system, wherein all of the components of the system are premixed and maintained in some unreactive state until applied. This system avoids both the necessity for mixing at the time of use and the loss of mixed but unused material attendant with the two-component system.

One such one-component system is disclosed in U.S. Patent 3,035,016. This patent describes a composition of matter capable of curing to an elastomer at room temperatures wherein the organopolysiloxane is diacyloxy endblocked. Compositions based on the said polysiloxane cure by exposure to moisture. Thus, the cure of this compound is dependent on moisture and the rate of curing dependent on the amount of moisture available. This varies widely throughout the world, so that the cure in, for example, Washington, D.C., is significantly faster than in, for example, Phoenix, Arizona.

The composition of this invention will cure at ordinary temperatures on exposure to air. The same rate of cure is obtained whether the air is desert dry or it is raining. Thus, an end-user can rely on a definite rate of cure irrespective of weather conditions.

This invention relates to an organosilicon block copolymer comprising (1) polysilane blocks of the structure $(R_2Si)_x$ wherein R is selected from the group consisting of hydrogen atoms, alkyl radicals, cycloalkyl radicals, aryl radicals, alkaryl radicals, aralkyl radicals and perfluoroalkylethyl radicals, there being an average of at least 2 silicon-bonded hydrogen atoms per polysilane block and $x$ has an average value of at least 3 and (2) blocks of the structure $(R'_nSiR''_{4-n/2})_y$, wherein R' is selected from the group consisting of monovalent hydrocarbon radicals and monovalent halohydrocarbon radicals, R'' is selected from the group consisting of divalent oxygen atoms, divalent hydrocarbon radicals, divalent hydrocarbon ether radicals and divalent haloarylene radicals, $n$ has an average value of from 1 to 2 inclusive and $y$ has an average value of at least 5.

Component (1) can be any polysilane containing two or more silicon-bonded hydrogen atoms per molecule. The remaining R radicals can be any one or more as stated above. Examples of such radicals include, for example, alkyl radicals such as methyl, ethyl, tertiarybutyl and octadecyl; cycloalkyl radicals such as cyclobutyl and cyclohexyl; aryl radicals such as phenyl, xenyl and naphthyl; alkaryl radicals such as tolyl and xylyl; aralkyl radicals such as benzyl and phenethyl and perfluoroalkylethyl radicals such as 3,3,3-trifluoropropyl, $$C_{10}F_{21}CH_2CH_2—$$

and $(CF_3)_2CHCH_2—$.

The average degree of polymerization of component (1) is at least 3. The term "degree of polymerization" as used herein means the average number of $R_2Si$ units per block. The degree of polymerization can be any amount greater than 3 ranging up to several thousand units. When the degree of polymerization is less than 3, the resulting copolymer will not cure properly, and may not cure at all. A preferred range of degree of polymerization of component (1) is from about 100 to about 500, as these materials are easier to make and several block units can be present in the finished copolymer.

Component (2) can be any organosilicon compound as stated above. Where it is desired that the end-product be an elastomer, it is preferred that $n$ in component (2) have an average value near 2. When $n$ is near 1, the resulting cured composition will ordinarily be resinous.

Radical R' can be any radical as recited above. Examples of such R' radicals include, for example, alkyl radicals such as methyl, ethyl, isopropyl, t-amyl and octadecyl; alkenyl radicals such as vinyl, allyl, methallyl and butadienyl; alkynyl radicals such as 2-butynyl; cycloaliphatic radicals such as cyclobutyl, cyclopentenyl and cyclohexadienyl; aryl radicals such as phenyl, xenyl, naphthyl and anthracyl; alkaryl radicals such as tolyl and xylyl; aralkyl radicals such as benzyl and phenethyl; and halogenated derivatives of the above such as chloromethyl, 3,3,3 - trifluoropropyl, 4 - bromo - 2 - butenyl, tetrachlorophenyl, etc. Any one or more of the said radicals can be present in component (2).

As stated above, radical R'' can be divalent oxygen or can be any divalent hydrocarbon radical such as alkylene such as mehtylene, ethylene, octadecylene, $$—CH_2CH(CH_3)—$$

and $—CH_2C(CH_3)_2—$; unsaturated divalent aliphatic radicals such as $—CH_2CH=CHCH_2—$ and $$—CH_2C\equiv CCH_2—$$

divalent cycloaliphatic radicals such as

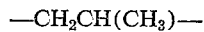

and divalent aromatic radicals such as

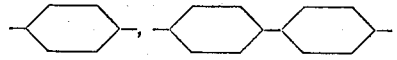

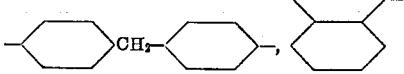

and

Radical R'' can also be any divalent hydrocarbon ether radical such as $—CH_2CH_2OCH_2CH_2—$, $$—CH_2CH(CH_3)OCH_2CH_2—$$

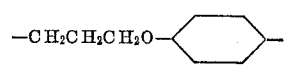

and

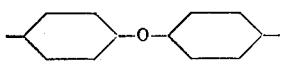

and any divalent haloarylene radical such as

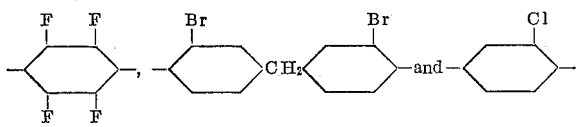

Any one or more of the said divalent groups can be present in component (2). In many cases, divalent oxygen is the only R'' group, because these materials (siloxanes) are the most readily available and, therefore, less costly but the R'' radicals other than oxygen can be equally well used. An alternating structure wherein alternate R'' radicals are divalent oxygen and one or more of the other said radicals is easily employed as well.

The average value of $y$ in component (2) should be at least 5. When the said value is less than 5, the resulting copolymer tends to be too unstable and may even spontaneously ignite on exposure to air. When the value of $y$ is greater than 5, the resulting copolymers are stable and cure well on exposure to air. Any average value of $y$ above about 5 will function in the composition of the invention. When component (2) has a very high degree of polymerization, such as when $y$ is approximately 5,000, these are somewhat cumbersome to handle in the preparation of the copolymer composition, so that a preferred range is from 5 to about 500 wherein these are fluids of reasonable viscosity.

Block units (2) can be derived from polymers, copolymers or mixtures of polymers and/or copolymers. This will be more clearly understood from the description of the preparation of the instant copolymers.

The copolymers of this invention are made by reacting halogen endblocked polysilanes of the formula $A(R_2Si)_xA$, wherein R and $x$ are defined for the instant copolymer and A is a halogen selected from chlorine, bromine or iodine, with an organosilicon compound containing silicon-bonded hydroxyl radicals wherein the organosilicon units are as of component (2) of the instant invention. The reaction proceeds upon mixing. For reasons given below, the reaction normally is carried out in the absence of both oxygen and water. If desired, the reaction can be carried out in an inert organic solvent, examples of which include benzene, toluene, heptane, dibutylether, dioxane, etc. If desired, an acid acceptor can be present but this is not necessary. Examples of suitable acid acceptors include such as alpha-picoline, pyridine and triethylamine. When an acid acceptor is used, it is usually desirable to remove any excess acid acceptor and the resulting halide salts after the reaction. In such cases, use of a solvent is desirable.

The halogen endblocked polysilanes referred to above are prepared by reacting dihalosilanes with alkali metals. The choice of dihalosilane determines the composition of component (1) of this invention. Any one or more diorganodihalosilane, organohydrogendihalosilane or dihydrogendisilane can be used, restricted, of course, by the types of organic groups that can be on component (1) of this invention. The halogen of these silanes is chlorine, bromine or iodine. Of course, when diorganodihalosilanes are used, there must be enough silicon-bonded hydrogen provided by including one or both of the other species supra to provide at least the minimum average amount of silicon-bonded hydrogen per molecule as called for in the invention. In addition, there need not be any diorganodihalosilane present. Thus, one can employ only dihydrogendihalosilanes, only one or more organohydrogendihalosilane, mixtures of the two, or any one or more of the two said species in combination with one or more diorganodihalosilane.

The alkali metal can be lithium, sodium, potassium, rubidium or cesium or mixtures thereof. The mixtures are useful in that they often melt at temperatures below the melting point of any one metal. In fact, some of the alloys are liquids at ordinary temperatures, making them easier to handle.

It is preferred that the reaction be carried out in an inert solvent. Either the halosilanes can be added to the alkali metal or the alkali metal can be added to the halosilanes. The reaction must be conducted in the absence of moisture and oxygen. The reaction is very exothermic and should be externally cooled. By inert solvent is meant one which will not react with the alkali metal or the halosilane. Suitable solvents include hydrocarbons such as hexane, heptane, benzene, toluene, mineral spirits, etc. and ethers and polyethers such as diethylether, dibutylether, dioxane, ethyleneglycoldimethylether, etc. The hydrocarbon solvents are preferred. The use of a solvent facilitates the reaction, in as much as many of the reactants are thick, viscous liquids and the product is even higher in viscosity. However, where thin (low viscosity) liquids are the reactants, a solvent is often not necessary. When the alkali metal is added to the halosilane, the degree of polymerization is usually lower than when the halosilane is added to the metal. Normally an excess of the halosilane is used. After the reaction, the alkali halide by-product is removed by filtration and the product is stripped to remove the solvent, if used, and excess halosilane. All manipulations must be conducted in the absence of both oxygen and moisture, and the product so stored. Moisture will cause hydrolysis of the halosilane or halopolysilane, while exposure of the polysilane to oxygen can result in a fire or possibly an explosion.

The composition of the instant invention cures when exposed to oxygen. The source of oxygen can be from air or other source. Because oxygen diffuses readily into organosilicon compounds, cure is obtained throughout the composition. The rate of cure is independent of the moisture content of the atmosphere. During cure the normally opaque composition changes to translucent or sometimes nearly clear. In the absence of oxygen, the copolymer composition is stable indefinitely. Samples stored for more than one year in the absence of oxygen show substantially no change in appearance or viscosity, there being no indication of cure having taken place.

If desired, additives normally used in connection with organosilicon compounds can be included in the instant composition, such as fillers (carbon blacks, silicas, clays, alumina, zinc oxide, iron oxide, calcium carbonate, etc.), pigments to impart desired colors, compression set additives, etc. Because of the sensitivity of the silicon-bonded hydrogen atoms to such as cleavage, it is important for maximum storage stability of the product that the said additives be essentially neutral. This consideration is unimportant where the product will be employed shortly after mixing.

The instant composition is useful in such applications as caulking, potting, filling and coating applications wherein an organosilicon elastomer is desired which cures at ordinary temperatures. Fluids of the instant composition are especially useful in certain applications because of satisfactory modulus, fast skin-over and unusually good adhesion, particularly to glass and aluminum.

The following examples are illustrative only and should not be construed as limiting the invention which is properly delineated in the appended claims.

Example 1

In a nitrogen-filled dry box the following materials were placed in a reaction vessel:

7.47 grams of a hydroxyl endblocked dimethylpolysiloxane having a viscosity of 13,000 cs. at 25° C.,
50 ml. of toluene and
3 ml. of pyridine.

With stirring, there was then added 7.29 grams of a chlorine endblocked methylhydrogenpolysilane having an average degree of polymerization of 405. The reaction mixture was stirred for 2¼ hours. The pyridine hydrochloride was removed by filtration and the product stripped of all toluene by heating to about 100° C. at a high vacuum. There were obtained 14.4 grams of a milk-white viscous liquid which was stable in the absence of air (oxygen), but which on exposure to air cured to a rubber.

*Example 2*

The experiment of Example 1 was repeated except there was used 0.69 gram of a hydroxyl endblocked dimethylpolysiloxane having a viscosity of 48.8 cs. at 25° C., 11.64 grams of the polysilane of Example 1 and 3.2 ml. of pyridine. There was obtained as the product 12.1 grams of an opaque block copolymer fluid having a yellowish color. On exposure to air this fluid cured to rubber.

*Example 3*

In this example the procedure of Example 1 was again used. The reactants were 31.59 grams of a hydroxyl endblocked dimethylpolysiloxane having a viscosity of 107,200 cs. at 25° C., 7.47 grams of the silane of Example 1 and 3.4 ml. of pyridine. The product was a milk-white high polymer having a viscosity greater than 1,000,000 cs. at 25° C., which cured to a rubber on exposure to air. The tensile strength of the resulting rubber was 111 p.s.i. with an elongation of 158 percent.

*Example 4*

Following the procedure of Example 1, there were mixed 20.13 grams of the siloxane of Example 3, 75 ml. of toluene and 3.5 ml. of pyridine, to which were added 0.69 gram of a chlorine endblocked polysilane containing dimethylsilane units and dihydrogensilane units in the ratio of 93:7 respectively, said polysilane having an average degree of polymerization of 45. The product was a very viscous milk-white fluid which was stable in the absence of air but which on exposure to air cured to a rubber.

*Example 5*

Following the procedure of Example 1 there were 21.72 grams of a hydroxyl endblocked dimethylpolysiloxane having a viscosity of 41,800 cs. at 25° C., 75 ml. of toluene, 3.8 ml. of pyridine to which was added 3.09 grams of a chlorine endblocked phenylhydrogenpolysilane fluid having a degree of polymerization of 77. There were obtained 24.4 grams of a very viscous milk-white fluid which was stable stored in the absence of air. When exposed to air, the fluid cured to a solid rubber.

*Example 6*

Following the procedure of Example 1 there were mixed 3.162 grams of a hydroxy endblocked copolymer containing block units of the structure

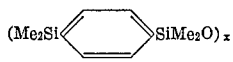

and block units of the structure $(Me_2SiO)_y$, the average ratio of $x$ to 5 being 12:37, the said copolymer being a hard, rubbery, benzene-soluble solid at 25° C., 75 ml. of toluene and 2.0 ml. of pyridine, to which were added 0.52 gram of the polysilane of Example 4. There were obtained 3.27 grams of a milk-white, tough, benzene-soluble copolymer, which was unchanged in the absence of air, but cured on exposure to oxygen to a benzene-insoluble rubbery mass.

*Example 7*

When equivalent amounts of the polysilanes shown below are substituted for the polysilane of Example 1, copolymer fluids are obtained which are stable in the absence of oxygen, but which cure to rubbery solids on exposure to oxygen or an atmosphere containing oxygen:

A. A chlorine endblocked polysilane containing 3,3,3-trifluoropropylmethylsilane units and dihydrogensilane units in the ratio of 70:30 respectively, having an average degree of polymerization of 75.

B. A bromine endblocked polysilane having diphenylsilane units, benzylmethylsilane units, phenylhydrogensilane units and cyclopentylmethylsilane units in the ratio of 30:20:40:10 respectively, having an average degree of polymerization of 45.

C. A chlorine endblocked tolylhydrogenpolysilane having a degree of polymerization of 125.

D. A chlorine endblocked polysilane containing methylhydrogensilane units, phenylhydrogensilane units and dihydrogensilane units in the ratio 50:40:10 respectively, having an average degree of polymerization of 18.

*Example 8*

The following materials were mixed rapidly on a laboratory 2-roll rubber mill:

10.0 grams of a hydroxy endblocked dimethylpolysiloxane having a Williams plasticity of .060 inch.
1.5 grams of a hydrophobic silica having on the surface thereof trimethylsiloxane units in the ratio of 0.1 trimethylsiloxane units per $SiO_2$ units of the silica, and having a surface area of 250 square meters per gram,
0.59 gram of a chlorine endblocked methylhydrogenpolysilane having a degree of polymerization of 405,
2 drops of alpha-picoline.

The milled composition was rapidly pressed into a sheet 0.060 inch thick and exposed to the oxygen of air, which exposure caused curing of the sample. During the said cure the sample changed from milk-white to nearly clear. Tensile strengths were obtained at intervals as follows:

| Exposure in days | Tensile in p.s.i. | Elongation in percent |
|---|---|---|
| 7 | 157 | 850 |
| 23 | 210 | 648 |
| 132 | 300 | 635 |

*Example 9*

The following materials were milled rapidly on a cold two-roll mill (in the presence of air) until thoroughly mixed:

20.0 grams of a hydroxyl endblocked dimethylpolysiloxane having a Williams plasticity of 0.60 inch,
7.0 grams of a fume silica having a surface area of 200 square meters per gram,
1.6 grams of a hydroxyl endblocked dimethylpolysiloxane fluid containing 3.04 weight percent silicon-bonded hydroxyl groups,
0.76 gram of the chlorine endblocked polysilane of Example 8,
2 drops of alpha-picoline.

The milled composition was rapidly pressed into a 0.069 inch thick sheet and exposed to oxygen of the air. The material cured and during the said cure changed from an opaque white color to nearly clear. The material was tack-free after less than two hours exposure. Tensile properties were determined at intervals as follows:

| Exposure in days | Tensile in p.s.i. | Elongation in percent |
|---|---|---|
| 17 | 110 | 325 |
| 62 | 160 | 410 |
| 126 | 175 | 390 |

*Example 10*

Block copolymers are obtained which are stable in the absence of oxygen, but which cure to elastomers on exposure to oxygen when equivalent amounts of the following siloxanes are substituted for the siloxane in Example 3:

A. A hydroxyl endblocked polysiloxane containing 90 mol percent ethylmethylsiloxane units and 10 mol percent octadecylmethylsiloxane units, having a viscosity of 40,000 cs. at 25° C.

B. A hydroxyl endblocked polysiloxane containing 2 mol percent allylmethylsiloxane, 10 mol percent diphenylsiloxane, 8 mol percent benzylmethylsiloxane and 80 mol percent ethylmethylsiloxane having a viscosity of 5,000 cs. at 25° C.

C. A hydroxyl endblocked 3,3,3-trifluoropropylmethylpolysiloxane having a viscosity of 160,000 cs. at 25° C.

D. A mixture containing 10 percent by weight of a hydroxyl endblocked polysiloxane containing 25 mol percent cyclopentylmethylsiloxane units and 75 mol percent dimethylsiloxane units, having a viscosity of 500 cs. at 25° C., and 90 percent by weight of a hydroxy endblocked polysiloxane containing 0.5 mol percent butenylmethylsiloxane units, 2.5 mol percent tolylmethylsiloxane units and 97 mol percent ethylmethylsiloxane units, having a viscosity of 900 cs. at 25° C.

E. A hydroxyl endblocked copolymer containing 10 mol percent dichlorophenylmethylsiloxane units, 5 mol percent chloromethylmethylsiloxane units and 85 mol percent phenylethylsiloxane units, having a viscosity of 5,000 cs. at 25° C.

F. A hydroxyl endblocked copolymer containing 5 mol percent diphenylsiloxane units, 0.14 mol percent vinylmethylsiloxane units and 94.86 mol percent dimethylsiloxane units, having a Williams plasticity of .090 inch.

*Example 11*

When 100 parts by weight of the fluid made according to Example 1 are mixed with any of the fillers listed below and thereafter exposed to oxygen as, for example, the oxygen of air, rubbery solids are obtained. When mixed and stored in the absence of oxygen, the mixtures remained essentially unchanged.

A. 15 parts by weight of a fume silica having a surface area of 100 square meters per gram.

B. 50 parts of diatomaceous earth.

C. 150 parts of zinc oxide.

D. 25 parts of a carbon black.

E. A mixture of 25 parts of crushed quartz and 25 parts of calcium carbonate.

F. 20 parts of a carbon black, the surface of which has been treated with a chlorosilane.

*Example 12*

4.74 grams of a hydroxyl endblocked dimethylpolysiloxane having a viscosity of 41,800 cs. at 25° C. were mixed with 1.52 grams of a chlorine endblocked methylhydrogenpolysilane having a degree of polymerization of 405 in a nitrogen filled dry box. The product was a very viscous milk-white fluid which was stable in the absence of oxygen but which cured to an elastomer on exposure to air containing oxygen.

*Example 13*

Equivalent results are obtained when either alphapicoline or triethylamine are substituted for the pyridine of Example 1.

*Example 14*

Following the procedure of Example 1 there were mixed 3.05 grams of a siloxane copolymer containing 50 percent by weight $C_6H_5SiO_{3/2}$ units and 50 percent by weight $(CH_3)_2SiO$ units having a Williams plasticity of .100 inch, 75 ml. of toluene and 1.0 ml. of pyridine, to which were added 0.44 gram of the polysilane of Example 4. There were obtained 3.25 grams of a milk-white high polymer which was unchanged in the absence of air but which on exposure to oxygen such as oxygen of the air cured to a tack free rubber.

*Example 15*

Following the procedure of Example 1 there were mixed 10.39 g. of a monophenylsiloxane resin containing about 3 percent silicon-bonded hydroxyl radicals, 50 ml. of toluene and 2.9 ml. of pyridine, to which were added a solution of 0.98 g. of a methylhydrogenpolysilane having a degree of polymerization of 107 in 25 ml. of toluene. The mixture was stirred at room temperature for 18 hours and then, with continued stirring, heated to about 80° C. for one day. When the pyridine hydrochloride salts were filtered, there was obtained a toluene solution of copolymer which when the solvent was allowed to evaporate in the absence of oxygen gave a material that could be redissolved in toluene but which when allowed to evaporate in the presence of oxygen, such as oxygen in the air, formed an insoluble resin.

That which is claimed is:

1. As a composition of matter an organosilicon block copolymer comprising (1) blocks of the structure $(R_2Si)_x$, wherein R is selected from the group consisting of hydrogen atoms, alkyl radicals, cycloalkyl radicals, aryl radicals, alkaryl radicals, aralkyl radicals and perfluoroalkylethyl radicals, there being an average of at least 2 silicon-bonded hydrogen atoms per polysilane unit and $x$ has an average value of at least 3 and (2) blocks of the structure $(R'_nSiR''_{4-n/2})_y$, wherein R' is selected from the group consisting of monovalent hydrocarbon radicals and monovalent halohydrocarbon radicals, R" is selected from the group consisting of divalent oxygen atoms, divalent hydrocarbon radicals, divalent hydrocarbon ether radicals and divalent haloarylene radicals, $n$ has an average value from 1 to 1 inclusive and $y$ has an average value of at least 5.

2. A composition of matter that is stable in the absence of oxygen, which composition comprises (A) a block copolymer comprising (1) blocks of the structure $(R_2Si)_x$ wherein R is selected from the group consisting of hydrogen atoms, alkyl radicals, cycloalkyl radicals, aryl radicals, alkaryl radicals, aralkyl radicals and perfluoroalkylethyl radicals, there being an average of at least 2 silicon-bonded hydrogen atoms per polysilane unit and $x$ has an average value of at least 3 and (2) blocks of the structure $(R'_nSiR''_{4-n/2})_y$, wherein R' is selected from the group consisting of monovalent hydrocarbon radicals and monovalent halohydrocarbon radicals, R" is selected from the group consisting of divalent oxygen atoms, divalent hydrocarbon radicals, divalent hydrocarbon ether radicals and divalent haloarylene radicals, $n$ has an average value of from 1 to 2 inclusive and $y$ has an average value of at least 5, and (B) a filler.

3. The method comprising curing an organosilicon blocked copolymer comprising (1) blocks of the structure $(R_2Si)_x$, wherein R is selected from the group consisting of hydrogen atoms, alkyl radicals, cycloalkyl radicals, aryl radicals, alkaryl radicals, aralkyl radicals and perfluoroalkylethyl radicals, there being an average of at least two silicon-bonded hydrogen atoms per polysilane unit, and $x$ has an average value of at least 3 and (2) blocks of the structure $(R'_nSiR''_{4-n/2})_y$, wherein R' is selected from the group consisting of monovalent hydrocarbon radicals and monovalent halohydrocarbon radicals, R" is selected from the group consisting of divalent oxygen atoms, divalent hydrocarbon radicals, divalent hydrocarbon ether radicals, and divalent haloarylene radicals, $n$ has an average value of from 1 to 2 inclusive and $y$ has an average value of at least 5, by exposing the said block copolymer to oxygen at ordinary temperatures.

4. The method of claim 3 wherein there is also present in the composition a filler.

5. A method of preparing organosilicon block copolymers comprising (1) blocks of the structure $(R_2Si)_x$ wherein R is selected from the group consisting of hydrogen atoms, alkyl radicals, cycloalkyl radicals, aryl radicals, alkaryl radicals, aralkyl radicals and perfluoroalkylethyl radicals, there being an average of at least 2 silicon-bonded hydrogen atoms per polysilane molecule and $x$ has an average value of at least 3 and (2) blocks of the structure $(R'_nSiR''_{4-n/2})_y$ wherein R' is selected from the group consisting of monovalent hydrocarbon radicals and monovalent halohydrocarbon radicals, R" is selected from the group consisting of divalent oxygen atoms, divalent hydrocarbon radicals, divalent hydrocarbon ether radicals and divalent haloarylene radicals, n has an average value of from 1 to 2 inclusive and y has an average value of at least 5, which method comprises mixing (A) polysilanes of the structure $A(R_2Si)_xA$ wherein R and x are as above defined and A is selected from the group consisting of chlorine, bromine and iodine with (B) organosilicon compounds having the structure $$(R'_nSiR''_{4-n/2})_y$$

wherein R, R", n and y are as defined above, there being in addition an average per molecule of at least 2 silicon-bonded hydroxyl radicals.

6. A method of preparing organosilicon block copolymers comprising (1) blocks of the structure $(R_2Si)_x$ wherein R is selected from the group consisting of hydrogen atoms, alkyl radicals, cycloalkyl radicals, aryl radicals, alkaryl radicals, aralkyl radicals and perfluoroalkylethyl radicals, there being an average of at least 2 silicon-bonded hydrogen toms per polysilane molecule and x has an average value of at least 3 and (2) blocks of the structure $(R'_nSiR''_{4-n/2})_y$, wherein R' is selected from the group consisting of monovalent hydrocarbon radicals and monovalent halohydrocarbon radicals, R" is selected from the group consisting of divalent ovygen atoms, divalent hydrocarbon radicals, divalent hydrocarbon ether radicals and divalent haloarylene radicals, n has an average value of from 1 to 2 inclusive and y has an average value of at least 5, which method comprises mixing (A) polysilanes of the structure $A(R_2Si)_xA$ wherein R and x are as above defined and A is selected from the group consisting of chlorine, bromine and iodine with (B) organosilicon compounds having the structure $(R'_nSiR''_{4-n/2})_y$, wherein R', R", n and y are as defined above, there being in addition an average per molecule of at least 2 silicon-bonded hydroxyl radicals in the presence of (C) an acid acceptor.

7. The composition according to claim 1 wherein for (1) R is methyl and hydrogen and for (2) R' is methyl.

8. Composition according to claim 1 wherein in component (1) R is phenyl and hydrogen and for (2) R' is methyl and phenyl.

9. The composition according to claim 1 wherein component (1) is a methylhydrogenpolysilane and component (2) is a dimethylpolysiloxane.

10. The composition of claim 2 wherein the filler is a silica.

11. The composition of claim 2 wherein component (1) is a methylhydrogenpolysilane and component (2) is a dimethylpolysiloxane.

12. The method of claim 3 wherein component (1) is a methylhydrogenpolysilane and component (2) is a dimethylpolysiloxane.

13. The method of claim 4 wherein component (1) is a methylhydrogenpolysilane and component (2) is a dimethylpolysiloxane.

14. The method of claim 5 wherein for (1) R is methyl and hydrogen and for (2) R' is methyl.

15. The method of claim 5 wherein for (1) R is phenyl and hydrogen and for (2) R' is phenyl and methyl.

16. The method of claim 6 wherein for (1) R is methyl and hydrogen and for (2) R' is methyl.

17. The method of claim 6 wherein for (1) R is phenyl and hydrogen and for (2) R' is phenyl and methyl.

18. The method of claim 5 further characterized in that the reaction of polysilane (A) with organosilicon compound (B) is carried out in the substantial absence of oxygen and moisture.

References Cited by the Examiner

UNITED STATES PATENTS

| | | | |
|---|---|---|---|
| 2,554,976 | 5/1951 | Burkhard | 260—46.5 |
| 2,696,480 | 12/1954 | Gordon et al. | 260—46.5 |
| 2,757,189 | 7/1956 | Clasen et al. | 260—46.5 |

MORRIS LIEBMAN, *Primary Examiner.*

ALEXANDER H. BRODMERKEL, *Examiner.*

J. W. BEHRINGER, J. H. DERRINGTON,
*Assistant Examiners.*